US008097576B2

(12) United States Patent
Hahn

(10) Patent No.: US 8,097,576 B2
(45) Date of Patent: Jan. 17, 2012

(54) COMPOSITION FOR THE PROTECTION OF GLASSWARE IN A DISHWASHING PROCESS

(75) Inventor: Karlheinz Ulrich Gerhard Hahn, Ludwigshafen (DE)

(73) Assignee: Reckitt Benckiser N.V., Hoofddorp (NL)

( * ) Notice: Subject to any disclaimer, the term of this patent is extended or adjusted under 35 U.S.C. 154(b) by 0 days.

(21) Appl. No.: 13/012,362

(22) Filed: Jan. 24, 2011

(65) Prior Publication Data

US 2011/0114127 A1 May 19, 2011

Related U.S. Application Data

(63) Continuation of application No. 12/472,985, filed on May 27, 2009, which is a continuation of application No. 10/558,211, filed as application No. PCT/GB2004/002176 on May 19, 2004, now abandoned.

(30) Foreign Application Priority Data

May 28, 2003 (GB) .................................... 0312143.1

(51) Int. Cl.

*C11D 7/20* (2006.01)
*C11D 7/10* (2006.01)
*B08B 9/20* (2006.01)
*C03C 3/16* (2006.01)
*C03C 3/00* (2006.01)

(52) U.S. Cl. ....... 510/227; 510/514; 252/387; 134/25.1; 134/25.2; 501/45; 501/46; 501/47; 501/48; 501/49; 501/73

(58) Field of Classification Search .................. 510/227
See application file for complete search history.

(56) References Cited

U.S. PATENT DOCUMENTS 2,726,161 A * 12/1955 Beck et al. ...................... 501/34
2,853,393 A * 9/1958 Beck et al. ...................... 501/34
3,677,820 A * 7/1972 Rutkowski ................... 134/25.2
4,198,232 A * 4/1980 Parr et al. ...................... 148/437
4,416,794 A * 11/1983 Barrat et al. .................. 510/514
4,443,270 A * 4/1984 Biard et al. .................. 134/25.2
4,743,302 A * 5/1988 Dumesnil et al. ............ 106/1.23
4,908,148 A * 3/1990 Caravajal et al. ............. 510/514
5,011,902 A * 4/1991 Foucht ............................ 528/55
5,341,358 A * 8/1994 Kobayashi et al. ........... 369/100
5,721,068 A * 2/1998 West et al. .................... 429/300
5,728,349 A * 3/1998 Persson ......................... 420/513
6,344,295 B1 * 2/2002 Huot ............................ 429/229
6,582,507 B1 * 6/2003 Cao et al. ...................... 106/479
7,261,760 B2 * 8/2007 Ishida et al. .................... 75/255
7,361,632 B2 * 4/2008 Hahn ............................ 510/227
7,456,142 B2 * 11/2008 Hahn ............................ 510/227
7,741,236 B2 * 6/2010 Hahn et al. ...................... 501/46
2002/0012608 A1 * 1/2002 Takaoka et al. ............... 420/561
2003/0052299 A1 * 3/2003 Umeda et al. ................ 252/62.6
2003/0220182 A1 * 11/2003 Izuki .............................. 501/46
2004/0018933 A1 * 1/2004 Ogino et al. ..................... 501/45
2004/0138043 A1 * 7/2004 Kasuga et al. .................. 501/45
2007/0181224 A1 * 8/2007 Marya et al. .................. 148/400

FOREIGN PATENT DOCUMENTS

EP 0 010 587 * 1/1983

* cited by examiner

*Primary Examiner* — Joseph D Anthony
(74) *Attorney, Agent, or Firm* — Norris McLaughlin & Marcus PA

(57) ABSTRACT

The present invention provides a composition. The composition comprises zinc and bismuth. The composition is for use in the protection of glassware in an automatic dishwashing process.

9 Claims, No Drawings

COMPOSITION FOR THE PROTECTION OF GLASSWARE IN A DISHWASHING PROCESS

This application is a Continuation application of U.S. patent application Ser. No. 12/472,985, filed on May 27, 2009, which is a Continuation application of U.S. patent application Ser. No. 10/558,211, filed on Nov. 3, 2006, now abandoned which is a 371 National Phase application of PCT/GB2004/002176 filed May 19, 2004, which claims priority to British applications 0312143.1, filed May 28, 2003.

The present invention relates to a composition comprising zinc and bismuth for use in the protection of glassware in an automatic dishwasher process.

The problem of glassware corrosion in automatic dishwasher processes is well recognised. It has been put forward that the problem of glassware corrosion is the result of two separate phenomena. Firstly, it is suggested that the corrosion is due to leakage of minerals from the glass network, accompanied by hydrolysis of the silicate network.

Secondly, silicate material is suggested to be released from the glass.

These phenomena can cause damage to glassware after a number of separate wash cycles. The damage may include cloudiness, scratches, streaks and other discoloration/detrimental effects.

Silicate materials have been suggested to be effective in preventing materials from being released by the glass composition. However, the use of silicate compounds can have detrimental side effects, such as the tendency to increase separation of silicate material at the glass surface.

A further solution has been to use zinc, either in metallic form (such as described in U.S. Pat. No. 3,677,820) or in the form of compounds. The use of soluble zinc compounds in the prevention of glassware corrosion in a dishwasher is described in, for example, U.S. Pat. No. 3,255,117.

However, the use of soluble zinc compounds can give rise to detrimental side effects, such as the development of a precipitate of insoluble zinc compounds formed by interaction with other species typically present in the dishwasher wash liquor. This has meant that often insoluble (or rather sparingly soluble) zinc compounds are preferred as the source of zinc in the dishwasher wash liquor. European Patents; EP-A-0 383 480, EP-A-0 383 482 and EP-A-0 387 997) describe the use of water insoluble compounds including zinc silicate, zinc carbonate, basic zinc carbonate ($Zn_2(OH)_2CO_3$), zinc hydroxide, zinc oxalate, zinc monophosphate ($Zn_3(PO_4)_2$) and zinc pyrophosphate($Zn_2P_2O_7$) for this purpose.

As these zinc compounds have only a low solubility in water it is usual that the compounds are required to have a relatively high surface area, achieved by having a small particle size, in order to attempt to achieve a sufficient concentration in water to obtain the required glass corrosion prevention effect. In this regard EP-A-0 383 480 and EP-A-0 387 997 specify that the zinc compound should have a particle size of lower that 250 μm, whereas EP-A-0 383 482 specifies a particle size of lower than 1.7 mm. However, the use of a small particle size has not been found to overcome the delivery issue and thus, with the use of these insoluble compounds, the problem of glass corrosion effects remain.

The use of glasses and ceramics containing zinc has been found to address the problem of glassware corrosion in a dishwasher. WO-A-01/64823 describes the use of a ceramic composition comprising zinc to protect glassware in an automatic dishwashing process. GB-A-2 372 500 and WO-A-00/39259 describe the use of a soluble glass composition comprising zinc (present in the form of ions) to protect glassware in an automatic dishwashing process. The use of a ceramic/glass zinc containing composition overcomes the problems of poor solubility/precipitation described above whilst offering effective glassware protection.

However, there is still a problem associated with the ceramic/glass zinc containing compositions (and also with water soluble/insoluble zinc compounds) in that these compositions do not perform satisfactorily in the prevention of decorated glassware corrosion.

Glassware (and also other crockery such as plates) may be decorated with a glaze to apply a pattern or design to the glassware/crockery. The glaze typically comprises an admixture of materials, similar to the admixture used in glass preparation, usually further comprising a metal oxide (such as lead oxide)/other compound to give the glaze a colour.

The glaze is usually applied to the glass in a second annealing firing process, normally at a lower temperature than the glass firing process. It is recognised that the lower firing temperature provides the glaze with a lower resilience/higher sensitivity to, for example, dishwashing conditions.

The glaze of decorated glassware/crockery can still suffer from corrosion, even in the presence of a zinc compound. Glaze corrosion has the effect of removing a portion of the glaze from the glassware/crockery over a number of dishwasher cycles. The glaze removal has the effect that the applied patterns lose their shine and the pattern colours fade. As glazes are commonly used on premium glassware products, such as handmade items, consumers washing these products are wary of washing glazed items in a dishwasher. Glazed product manufacturers are also wary of recommending the use of automatic dishwashing for cleaning these products. This can mean that the consumer has no alternative but to wash such glazed glassware/crockery by hand.

Bismuth has been used as an additive to aid the prevention of corrosion of glazed glassware corrosion. For example, BE 860180 describes the use of bismuth to avoid damage of decorated, glazed articles. However, the value of bismuth in this purpose has been diminished by the detrimental effects that the use of bismuth compound has on other components of the washing process. In this regard bismuth has been found to stain plastic materials (such as Tupperware®). Bismuth also causes the formation of a brown stain on non-decorated glassware and cutlery. Also although the glazed portion of the glassware may receive protection, bismuth has been found to stain the non-glazed portions.

For these reasons the use of bismuth as a glaze protector has been avoided.

It is an object of the present invention to obviate/mitigate the problems outlined above.

According to a first aspect of the present invention there is provided a composition comprising zinc and bismuth for use in the protection of glassware in an automatic dish-washing process.

According to a second aspect of the present invention there is provided the use of a composition comprising zinc and bismuth for the protection of glassware in an automatic dishwashing process.

In the present invention it is understood that the term glassware includes items made of glass (such as drinking glasses and plates) which may be decorated (such as with a glaze and/or with etching/glass addition). The term glassware is also understood to include other items of houseware, which may comprise a material other than glass (such as a ceramic) but which have a glass/glaze coating or decoration (such as a glazed ceramic plate).

It has been found that a combination of zinc and bismuth has especially beneficial properties in the prevention of glassware corrosion in an automatic dishwashing process. Indeed not only is the composition highly effective at protecting normal glassware but also the composition has been found to be highly effective in protecting glazed glassware/crockery. Thus a single composition may now be used to provide glassware corrosion protection for both decorated glassware/crockery and non-decorated glassware in a dishwasher.

Additionally the glass protection and glaze protection effects are achieved using a lower amount of each component metal than has previously been considered necessary. Namely, normal glass protection is now possible using a much lower amount of zinc that has been previously necessary (typically half the amount), when the zinc is used in combination with bismuth. Also, glazed glass protection has now been made possible using a much lower amount of bismuth that has been previously necessary (typically half the amount), when the bismuth is used in combination with zinc.

Due to the reduction of the amount of materials needed several further advantages are realised. Firstly, the cost of use of each material is lowered. Secondly the previously observed problems caused by the use of bismuth in an automatic dishwashing process can now be avoided. Thirdly the lower amount of each material means that the use of the composition has lower environmental impact and has less stringent regulations for packaging and consumer awareness. Fourthly, as soluble zinc and bismuth compounds has been found to reduce the effect of bleach on, for example, tea-cleaning performance, by reducing the zinc and bismuth amount this detrimental effect is drastically reduced.

The ratio of zinc to bismuth in the composition is preferably in the range from 1:100 to 100:1 (based on mass of the metals). More preferably the ratio of zinc to bismuth in the composition (by mass) is from 1:10 to 10:1, more preferably from 1:5 to 5:1 and most preferably about 1:1.

Bearing the ratios outlined above in mind, the amount of zinc and bismuth provided to a dishwasher cycle is preferably from 1 to 1000 mg, more preferably from 1 to 500 mg, more preferably from 1 to 200 mg and more preferably 5 to 100 mg. Preferably this weight refers to the combined weight of both metals.

Most preferably the zinc and bismuth are available as ions in the dishwasher washing liquor.

The zinc and bismuth may be in any suitable form to provide ions in the dishwasher liquid.

One example of a suitable form is the use of a metallic form of the metals. This form may be as separate forms of each metal disposed within the dishwasher. Such forms have been found to be solubilised over a number of wash cycles, to provide soluble ions of bismuth and zinc. The metal form may also comprise an admixture (such as an alloy) of zinc and bismuth. The alloy may contain further elements, such as other metal elements necessary to ensure stability/solubility of the alloy.

Preferred physical forms of the metal/alloy include sheets, perforated sheets, fibres, granules, powders, blocks (e.g. cuboid) or an admixture thereof.

Another example of a suitable form is the use of a salt or compound of one or both of bismuth and zinc. Most preferably the salt/compound is one which has an appreciable solubility in the washing liquor so that the effect of the zinc and bismuth can be observed. However, a salt of either element which only has a low solubility may also be used. In the latter case (as when a metallic form of one or more of the elements themselves is used) the amount of salt/compound which is used in the dishwasher may be increased accordingly to counter the low solubility of the low solubility salts.

Most preferably the salt/compound does not contain a component which is aggressive/detrimental to the dishwasher/dishwasher contents. In the case where the salt/compound is ionic it is preferred that the salt/compound is free from chloride anions which are recognised to have a detrimental effect on dishwashers (more particularly on stainless steel dishwasher components).

Preferred examples of soluble metal salts include compounds with anions such as nitrate, sulphate, halide (especially fluoride), phosphate (where soluble), carbonate and carboxylate (such as the anions from $C_1$-$C_{10}$ mono or multi carboxy function containing carboxylic acids, especially acetate and citrate).

Preferred examples of metal compounds having a lower solubility include the oxides of the metals.

An admixture of more than one compound may be used. Also a different compound of each metal may be used.

Most preferably the salt/compound is part of a detergent formulation. The detergent formulation may comprise a rinse aid.

The detergent formulation may be any common detergent formulation of the type which are usually employed with dishwashers. The formulation may comprise a liquid, gel, powder or tablet formulation. Where the formulation is a liquid/gel generally the zinc and bismuth will be present in solution within the liquid/gel. However, it is also contemplated to have the zinc and bismuth present in the liquid/gel in the form of an insoluble salt/compound so that the zinc/bismuth may comprise a suspended particle (e.g. such as a "speckle" typically found in these formulations).

The detergent formulation normally comprises other components which are typically found in dishwasher detergent formulations. In this regard the detergent formulation typically comprises one or more components selected from the group comprising surfactants (non-ionic, anionic, cationic and zwitterionic), builders, enzymes, foam suppressants, bleaches, bleach activators, thickeners, perfumes and dyes.

It is most preferred that when the bismuth and zinc are present together in a dishwasher detergent formulation, the metals comprise from 0.002 to 6 wt % (based on the weight of both metals) of the detergent formulation. More preferably the metals comprise from 0.01 to 3 wt % and most preferably from 0.02 to 1.3 wt % of the dishwasher detergent formulation (e.g. 0.4 wt % for a 20 g tablet).

In the case of a rinse aid, especially when the rinse aid is the only source of bismuth and zinc for the dishwasher, it is preferred that the metals comprise from 0.03 to 30 wt % (based on the weight of both metals) of the rinse aid formulation. More preferably the metals comprise from 0.15 to 15 wt % and most preferably from 0.3 to 7 wt % of the rinse aid formulation.

The zinc and bismuth may also be present in a soluble ceramic/glass formulation. The glass/ceramic may contain a glass forming material such as silica ($SiO_2$), an alkali/alkaline metal oxide (e.g. $Na_2O$) and a phosphorus oxide (e.g. $P_2O_5$)

The glass/ceramic may comprise a homogenous body or in the alternative may be ground/crushed. Where the glass/ceramic is ground or crushed it preferably has an average particle size of less than 500 μm.

It will also be appreciated that for all the forms of the bismuth and zinc mentioned above an admixture of different forms, wherein each metal is present in a different physical format may be used.

In this regard it is also possible that one of the metals may be present in an additive whilst the other metal may be present in a detergent/rinse-aid formulation. As an example the zinc may be present in the dishwasher detergent/rinse-aid together with one or more other detergent components whilst the bismuth may be added as a separate additive such as a glass composition which is disposed within the dishwasher machine. Clearly other combinations of physical forms which satisfy the requirement that both bismuth and zinc are supplied to the wash liquor in accordance with the present invention.

The invention is now further described with reference to the following non-limiting Examples.

EXAMPLES

Soluble Zinc/Bismuth Compounds*

*using 'S' as a post-script

In these Examples the following detergent composition (as shown in Table 1) was used as a detergent formulation base.

TABLE 1

| Component | % |
|---|---|
| Sodium Tripolyphosphate | 48.0 |
| Sodium Carbonate | 38.8 |
| Dye | 1.0 |
| Sodium Percarbonate | 6.0 |
| TAED | 2.0 |
| Protease | 1.3 |
| Amylase | 0.4 |
| Non-ionic Surfactant | 1.0 |
| Benzotriazole | 0.25 |
| Perfume | 0.15 |

Test Method

In the Examples test glasses were washed 50 to 100 times in a special endurance test dishwasher (Miele G 540 Special).

Cleaning Dosage: 20 g of the base detergent described above, further including bismuth and zinc in the Examples according to the invention (with the amount specified in the Examples) and with alternative additives (component and amount specified) in the comparative Examples. Automatic dosing at the beginning of the cleaning cycle.

Water Hardness in the machine: 0.1 dGH, central softening through ion exchangers, internal ion exchangers not in operation.

Cleaning program 65° C. (both the cleaning and the rinse cycle were operated at 65° C.)

Water consumption per cycle: 23.5 liters.

There was no soiling of the glassware tested.

The test report comprised the following types of glass:

Clear Glasses

Luigi Bormoli (Italy):

"linea Michelangelo David" C32 Whitewine glass 19 cl.

Royal Leerdam (Holland):

"Fiori" Whitewine glass 19 cl.

Arc-International (France):

"Luminarc Octime Transparent", Whisky glass 30 cl.

"Longchamp", 17 cl, Stemglass, lead crystal glass.

"Arcoroc Elegance", Wineglass, 14.5 cl.

Ruhr Kristall Glas (Germany):

"Kölner Stange", 24 cl, beer glass.

"RKG Bier", Beer Stemware, 38 cl.

Nachtmann Bleikristallwerke (Germany):

"Longdrink-glass", special edition (dishwasher sensitive), produced especially for Reckitt Benckiser.

Decorated Glassware

Ruhr Kristall Glas (Germany):

"Snoopy Look In", Longdrink Nordland 28 cl.

"Teddy", Primusbecher 16 cl.

Arc-International (France):

"Kenia", dinner plate, 19.5 cm.

The weight loss was determined gravimetrically after 50 to 100 test washes. Visible changes to the glass surface were evaluated in natural light or in a special light box. The dimensions of the light box were 70 cm×40 cm×65 cm (l×b×h) and the inside of the box was painted matt black. The box was lit from above with an L 20 w/25 S (60 cm long) Osram lamp, which was covered in front with a screen. Shelves were disposed in the box on which the glasses were placed for evaluation. The box was open at the front.

The glass corrosion was evaluated using the following criteria; glass clouding (GC), line corrosion (CL) and decoration damage (DS). The parameters glass clouding and line corrosion were used for the non-decorated glasses and the parameter decoration damage for the decorated glasses. For each parameter a score was given in accordance with the table below.

| Evaluation | Damage Impact |
|---|---|
| 0 | No glass damage |
| 1 | First minor damage/hardly visible |
| 2 | Slight damage, visible to expert or in the light box |
| 3 | Visible damage |
| 4 | Strong damage, clearly visible |

Comparative Example 1(S)

In this Comparative Example only zinc was added to the base detergent formulation. The zinc was present at 0.4% by weight (based upon zinc), as zinc sulphate mono-hydrate $ZnSO_4.H_2O$.

The results of the tests are shown in Table 2a (Glass Corrosion) and Table 2b (Mass Loss).

TABLE 2a

| Glass Corrosion | | | | |
|---|---|---|---|---|
| | 50 cycles | | 100 Cycles | |
| Glasses | GC | CL | GC | CL |
| Michelangelo | 0.5 | 2.0 | 2.0 | 3.0 |
| Octime | 2.5 | 2.0 | 2.5 | 2.5 |
| Longchamp | 1.0 | 2.0 | 2.0 | 2.5 |
| RKG Kölsch | 1.5 | 2.0 | 1.0 | 2.0 |
| RKG Bier | 2.5 | 2.0 | 2.5 | 2.0 |
| Nachtmann Longdrink | 1.5 | 0.0 | 2.5 | 0.0 |
| Arcoroc Elegance | 2.5 | 0.0 | 2.5 | 2.0 |
| Average | 1.71 | 1.43 | 2.14 | 2.00 |
| Decorated Glassware | DS | | DS | |
| Snoopy | 1.5 | | 2.5 | |
| Teddy | 1.5 | | 2.5 | |
| Kenia Plates | 2.0 | | 3.0 | |
| Average | 1.67 | | 2.67 | |

TABLE 2b

| Mass Loss | | |
|---|---|---|
| | 50 cycles Mass Loss (mg) | 100 cycles Mass Loss (mg) |
| Glasses | | |
| Michelangelo | 10 | 20 |
| Octime | 13 | 27 |
| Longchamp | 22 | 45 |
| RKG Kölsch | 10 | 21 |
| RKG Bier | 18 | 39 |
| Nachtmann Longdrink | 25 | 53 |
| Arcoroc Elegance | 10 | 20 |
| Sum | 108 | 225 |
| Decorated Glassware | | |
| Snoopy | 37 | 91 |
| Teddy | 12 | 35 |
| Kenia Plates | 28 | 77 |
| Sum | 77 | 203 |

Comparative Example 2(S)

In this Comparative Example only bismuth was added to the base detergent formulation. The bismuth was present at 0.4% by weight (based upon bismuth), as bismuth citrate.

The results of the tests are shown in Table 3a (Glass Corrosion) and Table 3b (Mass Loss).

TABLE 3a

| Glass Corrosion | | | | |
|---|---|---|---|---|
| | 50 cycles | | 100 Cycles | |
| Glasses | GC | CL | GC | CL |
| Michelangelo | 1.5 | 2.5 | 0.5 | 3.5 |
| Octime | 2.5 | 2.5 | 2.5 | 3.0 |
| Longchamp | 2.5 | 3.0 | 3.5 | 4.0 |
| RKG Kölsch | 2.0 | 2.5 | 2.0 | 4.0 |
| RKG Bier | 2.5 | 2.5 | 2.5 | 3.5 |
| Nachtmann Longdrink | 2.5 | 0.0 | 3.5 | 0.0 |
| Arcoroc Elegance | 2.5 | 2.5 | 3.0 | 4.0 |
| Average | 2.29 | 2.21 | 2.5 | 3.14 |
| Decorated Glassware | DS | | DS | |
| Snoopy | 0.5 | | 1.0 | |
| Teddy | 0.5 | | 0.5 | |
| Kenia Plates | 1.0 | | 1.0 | |
| Average | 0.67 | | 0.83 | |

TABLE 3b

| Mass Loss | | |
|---|---|---|
| | 50 cycles Mass Loss (mg) | 100 cycles Mass Loss (mg) |
| Glasses | | |
| Michelangelo | 17 | 26 |
| Octime | 20 | 28 |
| Longchamp | 44 | 76 |
| RKG Kölsch | 20 | 33 |
| RKG Bier | 33 | 45 |
| Nachtmann Longdrink | 58 | 79 |
| Arcoroc Elegance | 17 | 23 |
| Sum | 209 | 311 |
| Decorated Glassware | | |
| Snoopy | 21 | 28 |
| Teddy | 15 | 19 |
| Kenia Plates | 30 | 41 |
| Sum | 66 | 88 |

Comparative Examples 1(S) and 2(S) show that whilst zinc is able to provide corrosion protection for non-decorated glassware it offers poor protection for decorated glassware (when present in the formulation at 0.4 wt %).

Conversely bismuth is able to provide corrosion protection for decorated glassware yet it offers poor protection for non-decorated glassware (when present in the formulation at 0.4 wt %).

Example 1(S)

In this Example both bismuth and zinc were added to the base detergent formulation. The bismuth was present at 0.2% by weight (based upon bismuth), as bismuth citrate. The zinc was present at 0.2% by weight (based upon zinc), as zinc citrate.

The results of the tests are shown in Table 4a (Glass Corrosion) and Table 4b (Mass Loss).

TABLE 4a

| Glass Corrosion | | | | |
|---|---|---|---|---|
| | 50 cycles | | 100 Cycles | |
| Glasses | GC | CL | GC | CL |
| Michelangelo | 1.0 | 1.0 | 1.5 | 2.0 |
| Octime | 2.0 | 1.5 | 2.0 | 2.0 |
| Longchamp | 2.0 | 2.0 | 2.5 | 2.5 |
| RKG Kölsch | 0.0 | 1.5 | 1.0 | 2.0 |
| RKG Bier | 1.5 | 2.0 | 2.0 | 2.0 |
| Nachtmann Longdrink | 2.5 | 0.0 | 3.0 | 0.0 |
| Arcoroc Elegance | 2.0 | 2.0 | 2.5 | 2.5 |
| Average | 1.57 | 1.43 | 2.07 | 1.86 |
| Decorated Glassware | DS | | DS | |
| Snoopy | 0.0 | | 0.5 | |
| Teddy | 0.5 | | 1.0 | |
| Kenia Plates | 0.5 | | 0.5 | |
| Average | 0.33 | | 0.67 | |

TABLE 4b

| Mass Loss | | |
|---|---|---|
| | 50 cycles Mass Loss (mg) | 100 cycles Mass Loss (mg) |
| Glasses | | |
| Michelangelo | 18 | 27 |
| Octime | 10 | 16 |
| Longchamp | 16 | 33 |

TABLE 4b-continued

| Mass Loss | 50 cycles Mass Loss (mg) | 100 cycles Mass Loss (mg) |
|---|---|---|
| RKG Kölsch | 10 | 23 |
| RKG Bier | 11 | 27 |
| Nachtmann Longdrink | 21 | 54 |
| Arcoroc Elegance | 13 | 18 |
| Sum | 100 | 199 |
| Decorated Glassware | | |
| Snoopy | 14 | 29 |
| Teddy | 7 | 17 |
| Kenia Plates | 24 | 41 |
| Sum | 45 | 87 |

In contrast to Comparative Examples 1(S) and 2(S), Example 1(S) surprisingly shows that a formulation containing a combination of zinc and bismuth (both present at 0.2 wt %) provides equal/better non-decorated glassware corrosion protection (when compared to 0.4 wt % zinc). Additionally the combination of zinc and bismuth provides equal decorated glassware corrosion protection (when compared to 0.4 wt % bismuth).

These effects are both unexpected.

Thus, it has been shown that, with the inclusion of 0.2 wt % bismuth, the amount of zinc incorporated in a detergent formulation can be reduced by half (0.4 wt % to 0.2 wt %), yet the same amount of non-decorated glassware corrosion protection is still achieved. The same situation reduction applies for bismuth and decorated glassware with the incorporation of zinc.

Additionally the composition offers protection for both non-decorated and decorated glassware.

Examples

Metallic Zinc/Bismuth*

*using 'M' as a post-script

In these Examples the following detergent composition (as shown in Table 5) was used as a detergent formulation base.

TABLE 5

| Component | % |
|---|---|
| Sodium Tripolyphosphate | 45.0 |
| Sodium Carbonate | 18.5 |
| Sodium Bicarbonate | 2.0 |
| Dye | 0.15 |
| Sodium Perborate | 10.0 |
| TAED | 2.0 |
| Protease | 1.5 |
| Amylase | 0.5 |
| Non-ionic Surfactant | 3.5 |
| Polyethylene Glycol | 7.5 |
| Benzotriazole | 0.25 |
| Perfume | 0.15 |

Test Method, Glasses, Damage Evaluation

As for the soluble zinc/bismuth compounds.

Comparative Example 1(M)

In this Example only zinc was added to the base detergent formulation. The zinc was present at 0.06 g per cycle, in the form of a sheet of metallic zinc (13 mm×6 mm×1 mm, mass 60 g, mass loss 6 g over 100 cycles).

The results of the tests are shown in Table 6a (Glass Corrosion) and Table 6b (Mass Loss).

TABLE 6a

| Glass Corrosion | 100 Cycles | |
|---|---|---|
| Glasses | GC | CL |
| Octime | 0.5 | 2.5 |
| Longchamp | 2.0 | 3.5 |
| RKG Kölsch | 1.0 | 3.0 |
| Fiori | 1.0 | 3.5 |
| Nachtmann Longdrink | 3.5 | 0.0 |
| Arcoroc Elegance | 3.0 | 3.5 |
| Average | 1.83 | 2.67 |
| Decorated Glassware | DS | |
| Snoopy | 3.0 | |
| Teddy | 3.0 | |
| Kenia Plates | 4.0 | |
| Average | 3.33 | |

TABLE 6b

| Mass Loss | 100 cycles Mass Loss (mg) |
|---|---|
| Glasses | |
| Octime | 37.5 |
| Longchamp | 73 |
| RKG Kölsch | 47 |
| Fiori | 31 |
| Nachtmann Longdrink | 103 |
| Arcoroc Elegance | 29 |
| Sum | 320.5 |
| Decorated Glassware | |
| Snoopy | 276 |
| Teddy | 85 |
| Kenia Plates | 160 |
| Sum | 521 |

Comparative Example 2(M)

In this Example only bismuth was added to the base detergent formulation. The bismuth was present at 0.2 g per cycle, as fine metallic bismuth dust.

The results of the tests are shown in Table 7a (Glass Corrosion) and Table 7b (Mass Loss).

TABLE 7a

| Glass Corrosion | 100 Cycles | |
|---|---|---|
| Glasses | GC | CL |
| Octime | 1.5 | 4.0 |
| Longchamp | 3.5 | 3.5 |
| RKG Kölsch | 2.0 | 4.0 |
| Fiori | 1.5 | 4.0 |
| Nachtmann Longdrink | 3.0 | 0.0 |

TABLE 7a-continued

| Glass Corrosion | | |
|---|---|---|
| Arcoroc Elegance | 3.5 | 4.0 |
| Average | 2.5 | 3.25 |
| Decorated Glassware | DS | |
| Snoopy | 3.5 | |
| Teddy | 3.0 | |
| Kenia Plates | 4.0 | |
| Average | 3.5 | |

TABLE 7b

| Mass Loss | 100 cycles Mass Loss (mg) |
|---|---|
| Glasses | |
| Octime | 75.5 |
| Longchamp | 204 |
| RKG Kölsch | 90 |
| Fiori | 59 |
| Nachtmann Longdrink | 288 |
| Arcoroc Elegance | 64 |
| Sum | 780.5 |
| Decorated Glassware | |
| Snoopy | 413 |
| Teddy | 195 |
| Kenia Plates | 271 |
| Sum | 879 |

Comparative Example 3(M)

In this Example no bismuth nor zinc was added to the base detergent formulation.

The results of the tests are shown in Table 8a (Glass Corrosion) and Table 8b (Mass Loss).

TABLE 8a

| Glass Corrosion | 100 Cycles | |
|---|---|---|
| Glasses | GC | CL |
| Octime | 1.5 | 3.5 |
| Longchamp | 3.0 | 3.5 |
| RKG Kölsch | 2.0 | 4.0 |
| Fiori | 1.5 | 4.0 |
| Nachtmann Longdrink | 3.0 | 0.0 |
| Arcoroc Elegance | 4.0 | 4.0 |
| Average | 2.5 | 3.17 |
| Decorated Glassware | DS | |
| Snoopy | 3.5 | |
| Teddy | 3.5 | |
| Kenia Plates | 4.0 | |
| Average | 3.67 | |

TABLE 8b

| Mass Loss | 100 cycles Mass Loss (mg) |
|---|---|
| Glasses | |
| Octime | 78 |
| Longchamp | 210 |
| RKG Kölsch | 88 |
| Fiori | 86 |
| Nachtmann Longdrink | 242 |
| Arcoroc Elegance | 71 |
| Sum | 775 |
| Decorated Glassware | |
| Snoopy | 549 |
| Teddy | 151 |
| Kenia Plates | 276 |
| Sum | 976 |

Comparative Examples 1(M), 2(M) and 3(M) show that whilst metallic zinc is able to provide corrosion protection for non-decorated glassware it offers poor protection for decorated glassware.

Metallic bismuth offers poor protection for decorated and non-decorated glassware.

Example 1(M)

In this Example both bismuth and zinc were added to the base detergent formulation. The bismuth was present at 0.2 g per cycle, as fine metallic bismuth dust. The zinc was present at 0.06 g per cycle, in the form of a sheet of metallic zinc (13 mm×6 mm×1 mm, mass 60 g, mass loss 6 g over 100 cycles).

The results of the tests are shown in Table 9a (Glass Corrosion) and Table 9b (Mass Loss).

TABLE 9a

| Glass Corrosion | 100 Cycles | |
|---|---|---|
| Glasses | GC | CL |
| Octime | 0.5 | 2.5 |
| Longchamp | 2.5 | 3.0 |
| RKG Kölsch | 1.0 | 2.5 |
| Fiori | 0.5 | 3.0 |
| Nachtmann Longdrink | 2.5 | 0.0 |
| Arcoroc Elegance | 2.5 | 3.0 |
| Average | 1.58 | 2.33 |
| Decorated Glassware | DS | |
| Snoopy | 2.5 | |
| Teddy | 2.5 | |
| Kenia Plates | 3.0 | |
| Average | 2.67 | |

TABLE 9b

| Mass Loss | |
|---|---|
| | 100 cycles Mass Loss (mg) |
| Glasses | |
| Octime | 25 |
| Longchamp | 69 |
| RKG Kölsch | 41 |
| Fiori | 29 |
| Nachtmann Longdrink | 92 |
| Arcoroc Elegance | 27 |
| Sum | 283 |
| Decorated Glassware | |
| Snoopy | 181 |
| Teddy | 76 |
| Kenia Plates | 118 |
| Sum | 375 |

In contrast to Comparative Examples 1(M), 2(M) and 3(M), Example 1(M) surprisingly shows that a formulation containing a combination of metallic zinc and bismuth provides enhanced non-decorated glassware corrosion protection (when compared to only one of the metals). Additionally the combination of zinc and bismuth provides enhanced decorated glassware corrosion protection (when compared to only one of the metals).

These effects are both unexpected.

The invention claimed is:

1. A method for protecting glassware in an automatic dishwashing process comprising providing a composition comprising zinc and bismuth into a dishwasher and washing the glassware in the presence of said composition, wherein the mass ratio of zinc to bismuth in the composition is 1:100 to 100:1, wherein the amount of zinc and bismuth provided to a dishwasher cycle is from 1 to 1000 mg.

2. The method according to claim 1 wherein the ratio of zinc to bismuth in the composition (by mass) is from 1:10 to 10:1.

3. The method according to claim 1 wherein the amount of zinc and bismuth provided to a dishwasher cycle is from 5 to 500 mg.

4. The method according to claim 1 wherein the composition comprises a soluble ceramic/glass formulation.

5. The method according to claim 1 wherein the composition comprises a detergent formulation.

6. The method according to claim 1 wherein the zinc or bismuth are in metallic form.

7. The method according to claim 6 wherein the metallic form is an alloy of zinc and bismuth.

8. The method according to claim 1 wherein the zinc and/or bismuth are present as a salt or compound.

9. The method according to claim 8 salt or compound is a nitrate, oxide, sulphate, phosphate, halide, carbonate or carboxylate salt.

* * * * *